US012779260B1

United States Patent
Williams et al.

(10) Patent No.: US 12,779,260 B1
(45) Date of Patent: Nov. 3, 2026

(54) SYSTEM AND METHOD FOR DISPENSING FLAME-RETARDANT FOAM USING SPRINKLERS

(71) Applicant: UIPCO, LLC, San Antonio, TX (US)

(72) Inventors: Kristopher Thomas Williams, Helotes, TX (US); Nikhil Dama, Apex, NC (US); David Patrick Dixon, Boerne, TX (US); Jess W. Gingrich, San Antonio, TX (US); Arthur Eugene Cutter, IV, Colorado Springs, CO (US); Surender Kumar, Palatine, IL (US)

(73) Assignee: United Services Automobile Association (USAA), San Antonio, TX (US)

( * ) Notice: Subject to any disclaimer, the term of this patent is extended or adjusted under 35 U.S.C. 154(b) by 156 days.

(21) Appl. No.: 18/619,631

(22) Filed: Mar. 28, 2024

Related U.S. Application Data

(60) Provisional application No. 63/493,188, filed on Mar. 30, 2023.

(51) Int. Cl.
*A62C 3/02* (2006.01)
*A62C 5/02* (2006.01)

(52) U.S. Cl.
CPC ............ *A62C 3/0257* (2013.01); *A62C 5/024* (2013.01)

(58) Field of Classification Search
CPC ........... A62C 5/002; A62C 5/02; A62C 5/024; A62C 3/0257; A62C 3/0264
USPC ... 169/43, 45, 46, 47, 56, 60, 61, 70, 16, 14
See application file for complete search history.

(56) References Cited

U.S. PATENT DOCUMENTS 5,931,233 A * 8/1999 La Bonte ............... A62C 37/40 169/48
11,247,087 B2 * 2/2022 McDonald ........... G08B 17/005
11,583,713 B2 * 2/2023 Hofmann .................. G01F 1/68
11,684,812 B2 * 6/2023 Andersson ............... A62C 5/02 169/14
11,865,389 B2 * 1/2024 Jiang ........................ A62C 5/02
11,944,856 B1 * 4/2024 Reese, III ............ A62C 35/026

* cited by examiner

*Primary Examiner* — Gerald L Sung
*Assistant Examiner* — Sean V Meiller
(74) *Attorney, Agent, or Firm* — Plumsea Law Group, LLC

(57) ABSTRACT

A method and system of protecting a structure from an approaching fire by dispensing flame-retardant foam. The system works in conjunction with a set of sprinkler heads that are fluidly connected to both a water supply and a foam supply. Upon determining there is a high likelihood of a fire impacting the structure the system can automatically trigger a protective action whereby one or more sprinkler heads dispense the foam. The foam can be dispensed in different configurations, and form a perimeter around the structure, and/or coat the exterior of the structure.

20 Claims, 10 Drawing Sheets

SYSTEM AND METHOD FOR DISPENSING FLAME-RETARDANT FOAM USING SPRINKLERS

CROSS-REFERENCE TO RELATED APPLICATION

This application claims the benefit of U.S. Provisional Patent Application Ser. No. 63/493,188 filed on Mar. 30, 2023 and titled "System and Method for Dispensing Flame-Retardant Foam Using Sprinklers", the disclosure of which is incorporated by reference herein in its entirety.

TECHNICAL FIELD

The present disclosure generally relates to methods and systems for dispensing flame-retardant foam to protect a structure. In particular, the disclosure relates to a system for distributing flame-retardant material to exterior walls of a house or other building using sprinklers.

BACKGROUND

Destruction of buildings by fire from the outside is becoming more prevalent. The number of wildfires per year is increasing as people make greater use of developed and undeveloped areas of natural spaces. Both business, such as forestry, and personal use, such as hunting and camping, contribute to the number of fires used in natural such outdoor spaces. Sometimes fireworks used in celebratory occasions also cause accidental building fires in residential and commercial properties. With an increase in the number of users comes additional pressures upon the land, both in increased fire risk but also by increased numbers of less-well trained and inexperienced users makes even a small fire a dangerous one.

Global warming also contributes to the danger of fires in outdoor spaces by drying the fuel sources and strengthening of storm winds, thus increasing the intensity of a fire. Wildfires tend to burn hotter, sending embers high into the wind. Thus, embers are transported farther than they have been in the past and are distributed into a larger area. As these hotter embers and smoke are carried further, they impinge upon more and more inhabited areas. Denser habitation means denser building, and more chance of building fires.

Defense against wildfires is difficult. Many such fires burn in areas devoid of roads. Further, such natural spaces often are devoid of on-demand water sources, such as hydrants, and there often are but few people present to fight a fire. Many structures are uninhabited for months at a time. Also, such fires may spread fast, remain undetected for long periods, and are difficult to extinguish.

The burning of buildings in areas that experience wildfires is generally inevitable. There is a need in the art for a system and method that addresses the shortcomings discussed above.

SUMMARY

In one aspect, a method for protecting a property from fire is disclosed. The method includes a first step of receiving, at a fire protection system, first data describing environmental conditions around a structure situated on the property. The method also includes a second step of determining, at the fire protection system and based on the first data, there is a high likelihood of a fire approaching the structure. A third step includes executing, by the fire protection system, a protective action that includes: (a) supplying a flame-retardant foam to a sprinkler system associated with the property, and (b) dispensing the flame-retardant foam from one or more sprinkler heads of the sprinkler system, thereby creating a foam barrier between the structure and the approaching fire. In some cases, the sprinkler system can first be switched to a fire prevention mode or configuration before initiating the dispensing of the foam.

In another aspect, a method for protecting property from fire can include a first step of receiving, at a fire protection system, a first request by a first user to initiate a protective action on behalf of a structure situated on the property, and a second step of executing, by the fire protection system, the protective action that includes: supplying a flame-retardant foam to a sprinkler system associated with the property, optionally switching the sprinkler system to an appropriate fire prevention mode, and dispensing the flame-retardant foam from one or more sprinkler heads of the sprinkler system, thereby creating a foam barrier between the structure and the approaching fire.

In another aspect, a system for protecting property from fire is disclosed. The system includes a processor and machine-readable media including instructions which, when executed by the processor, cause the processor to receive, at a fire protection system, first data describing environmental conditions around a structure situated on the property. The instructions further cause the processor to determine, at the fire protection system and based on the first data, there is a high likelihood of a fire approaching the structure. In addition, the instructions cause the processor to execute, by the fire protection system, a protective action that includes: supplying a flame-retardant foam to a sprinkler system associated with the property, and dispensing the flame-retardant foam from one or more sprinkler heads of the sprinkler system, thereby creating a foam barrier between the structure and the approaching fire.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
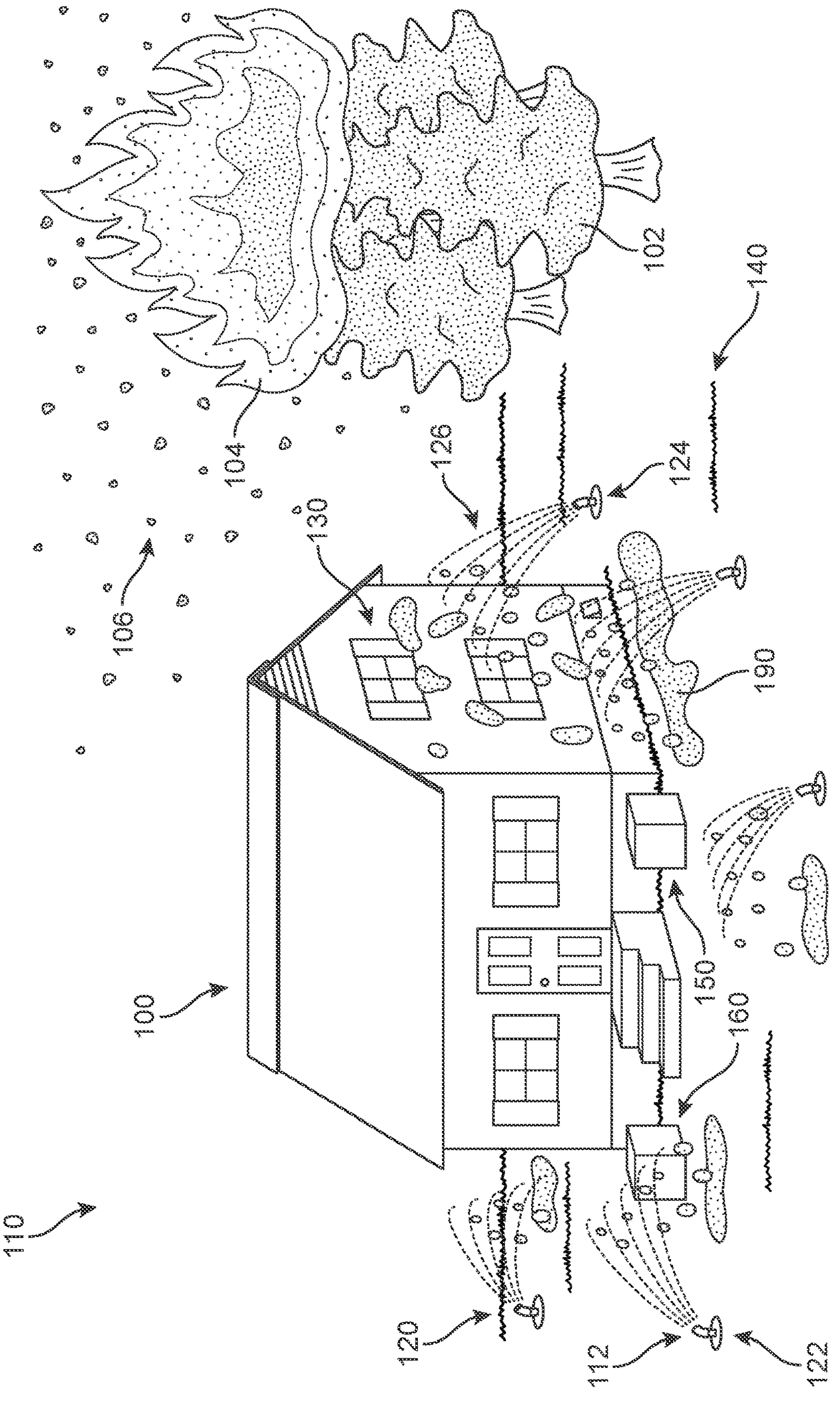
FIG. 1 is an overview of a fire protection system configured to dispense flame-retardant foam around a structure in response to detection of approaching fire-events, according to an embodiment.

Systems and methods for dispensing flame-retardant foam under emergency circumstances are disclosed. The system includes one or more smart devices and/or more Internet-of-Things (IoT) devices connected to a network configured to detect the approach of a wildfire or other evidence of an imminent fire near a building. Based on the sensed information, the system can determine if there is a high enough likelihood of a fire and whether protective measures should be activated. In response to such a determination, the system is configured to trigger the release of flame-retardant foam (also referred to herein simply as "foam") from one or more sprinkler devices disposed around the property on which the building is located. For example, if the system determines a high likelihood that a wildfire is approaching the building, the system can leverage its network and information about the location of each sprinkler device to identify the ideal or optimal protective response that will protect the building. In one example, the system incorporates existing lawn sprinkler systems to dispense the foam. In some embodiments, the system will trigger a switch from a water-only supply to a water+chemical supply. The chemical, added to the water, will produce the foam as it streams out from the sprinkler(s).

In some embodiments, the foam can be dispensed in the same area that had previously been irrigated with water. In this embodiment, the system creates a perimeter around the house that would be covered in flame-retardant foam. The goal of this approach is to keep the forest fire some distance away from the house, and to prevent the forest fire from jumping to the house. In another embodiment, the direction of the sprinkler heads can be re-directed when dispensing flame-retardant foam. In this embodiment, the sprinkler heads are aimed at the exterior surface of the house and the flame-retardant foam is sprayed directly onto the house with the intent of covering the house in flame-retardant foam. In still another embodiment, only some of the sprinkler heads can be switched to foam, in order to conserve the chemical supply and focus the foam cover to the side(s) of the house that are facing the oncoming fire source.

For ease of description herein, the description and claims are directed to use of flame-retardant foam. However, other compositions, such as gels, that have the same relevant properties and characteristics as foam also may be used in accordance with this description. For example, flame-retardant gels may be used in embodiments. Such flame-retardant gels are of the type that will have flame-retardant effect, will flow down the surfaces to be protected, can be distributed with essentially the same type of distribution system, and which typically may be compactly stored in a concentrated form and diluted for use, stored suitably may be used. In some embodiments, the foam is stored in discrete parts, such as water+some chemical. In different embodiments, one or more of bromine, chlorine, phosphorus, nitrogen, metals, or boron can be added at or shortly before the time of dispersal. In other examples, the foam is stored under pressure in its combined form and simply released through the sprinkler system when required.

In different embodiments, any suitable foam-forming system may be used in embodiments of the disclosure. For example, protection of a structure against intrusion of a wild fire likely would call for a Class A foam. Such foams typically are aqueous foams, like the embodiment described herein, and may be suitable for use in the pressurized distribution system described herein as a suitable embodiment of the disclosure. Typically, a fire burning outside a structure would not present complicating factors such as the need to protect alcohol-containing liquids, hydrocarbon liquids, and other products that preclude use of aqueous foams. However, if these complicating features are present, or if a fire started in the exterior was likely to gain access to the interior, a different class of foam could be considered. If, for example, the structure to be protected is a lean-to under which one of these liquids is stored, a different foam product might be more appropriately used. The skilled practitioner will be able to select a suitable flame-retardant foam-forming product for the application at hand.

In some embodiments, the proposed systems can use a mix of water, synthetic detergents, and corrosion inhibitors to produce foam. In another example, water enhancers may be added to the water supply that is dispensed. Such water enhancers are made up of thickeners, stabilizers, as well as super absorbent polymers like those found in some absorbent pads and disposable diapers. In some embodiments, other fire-retardants that include a mix of water, ammonium polyphosphate, thickeners, and corrosion inhibitors can be applied to the mechanical surfaces of the sprinkler system itself to protect the machinery that applies the product. In general, water additives reduce fire intensity and spread more effectively than water alone, giving firefighters or other attempts to control the fire a greater chance of successfully protecting life and property. By using these additives, firefighters can use the available water more efficiently and effectively, which is important when water is in short supply during hot dry conditions. The use of water additives also gives firefighters the option to fight fires 'indirectly' as they can create chemical fire-breaks ahead of the threatening fire without having to clear or back-burn vegetation. A benefit of such materials is that they can be pumped and applied through normal water application methods such as a standard or conventional lawn sprinkler system. In one example, one or more sprinkler heads can be connected to a supply of Compressed Air Foam Systems (CAFS) which use water, fire foam concentrate, and compressed air to create thick blankets of firefighting foam using small amounts of water. This makes the water usage more effective and efficient. A 'CAFS' blanket can be used to cover the exterior walls, vegetation, and other property assets to help protect them from the threatening fire.

Various terms related to fire and fire management may also be used in this description. For purposes of this application, a fire perimeter refers to an entire outer edge or boundary of a fire. A flare-up refers to any sudden acceleration of fire spread or intensification of a fire, and a hotspot refers to a particularly active part of a fire. In addition, an incident refers to a human-caused or natural occurrence, such as wildland fire, that requires protective action(s) to prevent or reduce the loss of life or damage to property or natural resources.

For purposes of introduction, FIG. 1 schematically illustrates a wild fire near a structure 100 having a roof and at least one wall. The structure 100 is located on a property 110. Nearby trees 102 are engulfed in flames 104, as would occur in a wild fire. Fire 104 generates embers 106, which are sufficiently hot to start their own fire. Embers 106 are carried away from fire 104 and toward structures, such as structure 100, by the wind, air convections caused by the heated air, and other air phenomena. Whereas structure 100 may depict a home, other buildings, such as garages, shelters, office buildings, other commercial buildings (such as retail stores, warehouses, hotels, shopping centers, medical centers, hospitals etc.), condominiums, apartment buildings, and lean-tos that have a roof, also may utilize systems of the disclosure.

An embodiment of a flame-retardant foam dispensing system ("system") 120 installed on property 110 is also illustrated in FIG. 1, including or being in fluid communication with a sprinkler system 112 comprising a plurality of sprinkler heads 122 arrayed on surrounding grass 140 (e.g., a lawn) and connected to a pump and water supply 150 via a network of pipes and/or tubes or other fluid connective mechanisms. In another embodiment the sprinkler system is primarily installed to water flowers in a flower garden or vegetable garden or other bushes around the building. The system 120 also includes a foam or water additive supply 160 that is connected to the sprinkler system 120. Upon detection of the fire 104, the system 120 initiates a protective response whereby foam 190 is ejected, released, or otherwise dispensed from one or more of the plurality of sprinkler heads 122. For example, a first sprinkler head 124 is shown emitting a first stream 126 of foam 190 in a direction toward the structure 100. In some embodiments, the first stream 126 can coat an outer surface of a wall 130 for the structure 100. In one example, the first stream 126 is directed at a second-story of the structure 100, or otherwise nearer to the roof, to allow gravity to keep the foam solution flowing downwardly, encouraging the spread of foam to occur laterally across or facilitate its distribution along the outer surface area of the wall 130. As a result, as embers 106 move closer to the structure 100, the foam 190 serves as an intermediary or protective shield that blocks or repels the nearby flames, and reduces the likelihood of fire-damage to the home.

Figure 2:
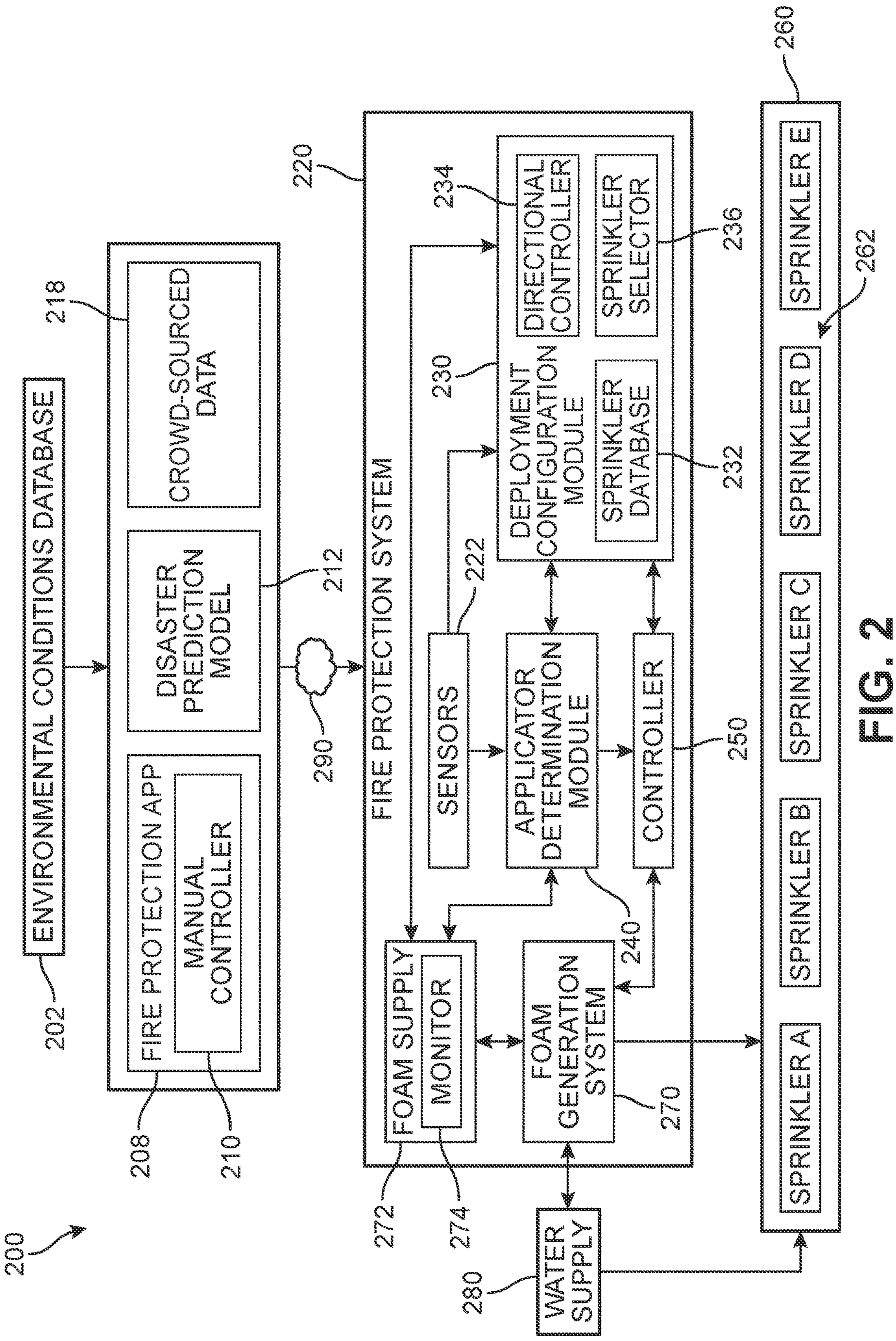
FIG. 2 is a schematic diagram of an environment for implementation of a fire protection system, according to an embodiment.

In order to provide the reader with a greater appreciation of the embodiments, FIG. 2 depicts an overview of an embodiment of an environment 200 in which a fire protection system ("system") 220. In different embodiments, the system 220 includes or has access to one or more devices that are equipped to detect heat and/or fire-related data. This data can be used by the system 220 to identify potential fire sources via an applicator determination module 240. For example, applicator determination module 240 can determine whether there is a high likelihood of a fire-event currently taking place within a predefined range or vicinity of a structure, and/or whether there is high likelihood of a fire-event occurring (imminently, i.e., within a day, a few hours, a few minutes, etc.) within a predefined range or vicinity of a structure.

In some embodiments, this determination can be made based only on data collected by one or more local data collection devices (e.g., sensors 222), such as heat-detection sensors and/or IoT (Internet of Things) network devices that are associated with the property on which the structure is located. In some embodiments, these sensors 222 are connected over one or more networks to a cloud-based platform ("service"), or a local (on-site) computing device. In different embodiments, networks could include one or more Wide Area Networks (WANs), Wi-Fi networks, Bluetooth or other Personal Area Networks, cellular networks, as well as other kinds of networks. It may be appreciated that different devices could communicate using different networks and/or communication protocols. The devices can include computing or smart devices as well as more simple IoT devices configured with a communications module. The communication module may include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. In many cases, the communication module is a wireless connection; however, wired connections may also be used. For example, the communication module may include a wired serial bus such as a universal serial bus or a parallel bus, among other connections.

In different examples, a sensor of sensors 222 can comprise a sensor unit includes one or more of a variety of sensors. The sensors can include an infrared (thermographic), thermal, or heat sensor, among others. In some embodiments, devices can include one or more sensors such as infrared detection sensors or other smart sensors. Infrared detection refers to the use of heat sensing equipment, also known as infrared (IR) scanners, cameras, imaging devices, or sensors, for detection of heat sources. As a general matter, an infrared sensor may be configured to detect infrared radiation (e.g., infrared energy) from a target scene including, for example, mid-wave infrared wave bands (MWIR), long-wave infrared wave bands (LWIR), and/or other thermal imaging bands as may be desired in particular implementations. Other fire detection devices may include any number and type of sensors, such as smoke/fire/heat sensors, carbon monoxide/dioxide sensors, ambient light sensors, temperature sensors, humidity sensors, and the like, each of which may be configured to send messages to the other devices and/or a central server or cloud-computing system.

In other cases, a sensor may include a microphone that can collect data to determine whether specific sounds in the house or building indicate an emergency situation, or sounds that are anomalous to the environment and may represent fire-related danger. For purposes of this application, the term ambient noise information is the sound profile collected for a particular location or space during normal, day-to-day use of such space. In some embodiments, current sound information is received by a sensor or other smart device, which identifies whether there is a variation in sound between the current sound information and the ambient noise information. The ambient noise information is subtracted from the current sound information if the variation has been identified, to identify a sound anomaly. The smart device extracts a sound anomaly signal and sends it to a database, where the sound anomaly signal is compared to predetermined anomaly signals stored in a database wherein the predetermined anomaly signals are associated with diagnostic information. For example, the sound of crackling or trees cracking or breaking can trigger a response by the applicator determination module 240. In some other embodiments, a device or associated sensor can include features found on some smart devices. For example, a camera may be used to document optional factors, such as color and quality (density) of smoke or flames or the amount of light available.

In different embodiments, IoT devices could comprise any of a variety of different "smart" sensor devices, such as one or more of a pressure sensor, chemical sensor (for detecting smoke, carbon monoxide or other chemical compositions), temperature sensor, magnetometer, smoke/flame detectors, moisture sensor, electrostatic sensor, volume/sound sensors, light sensors, aerosol characterization sensors, and other smart devices that may include one or more sensors. Data from smart sensors can be received by the applicator determination module 240 of the service or local computing device and used to determine areas of imminent fire or current danger.

In addition, each sensor device of sensors 222 can include provisions for communicating with, and processing information from, a remote service as well as other local devices. Each sensor device may include one or more processors and memory. Memory may comprise a non-transitory computer readable medium. Instructions stored within memory may be executed by the one or more processors. In addition, each sensor device may include a communication system such as a radio or other provisions for communicating using one or more communication methods. In particular, communication system includes provisions for communicating with other nearby devices and/or remote service over networks. For example, each communication system could include a Wi-Fi radio, a Bluetooth radio, and/or a cellular network radio.

In some embodiments, the applicator determination module 240 may be programmed to detect occurrences of temperature increases that exceed a particular threshold, and/or actual sensed temperatures that are above a particular threshold. For example, any measured temperature that exceeds 100° C. (or some other selected temperature) may trigger a response from applicator determination module 240 via a controller 250. For example, the applicator determination module 240 can send a request to the controller 250 to cause release of foam by sprinkler system 260 in response to excessive temperatures. In some other embodiments, the system can be configured to also or alternatively detect temperatures changes that exceed a particular threshold. As an example, the applicator determination module 240 may trigger a response if any specific location increases in temperature more than 5-10° C., or some other preselected threshold temperature. As another example, the applicator determination module 240 can be configured to cause the controller 250 to activate, implement, or execute a protective response if the temperature for a specific location increases more than a particular magnitude (e.g., 20-25° C. or some other preselected temperature) over a preselected period of time (e.g., 10-30 seconds or some other period of time). These temperatures and time periods are only illustrative, and any suitable temperatures and time period may be used, as desired.

Furthermore, in different embodiments, the system 220 can be configured to receive infrared-based data from each sensor device equipped with an infrared sensor. For example, in FIG. 2, sensors 222 can include one or more infrared sensors that can each transmit in real-time or near-real-time the infrared data obtained by the sensor, and the location and/or direction from which this data is received. In one embodiment, this data is received by the applicator determination module 240 and used to make a decision as to whether to initiate an application of flame-retardant foam.

In different embodiments, an area in the observed real-world scene can be evaluated by the infrared sensor by applying a comparison of the detected infrared radiation values in the area to a mean value of the detected infrared radiation relating to surrounding areas. Changes in temperature in a target area that exceed a particular threshold can be referred to as a local environmental change. Generally, when an area with lower infrared radiation is detected (e.g. in the form of thermal values or temperatures) relative to the mean detected infrared radiation of surrounding areas, this can be referred to as the detection of a "cold spot". In contrast, when an area with higher infrared radiation is detected (e.g. in the form of thermal values or temperatures) relative to the mean detected infrared radiation of surrounding areas, this can be referred to as the detection of a "hot spot" which may indicate for instance that the area comprises overheated features and has an increased risk of catching fire.

In some embodiments, an end-user can interact with the proposed system, for example via a user application ("application"). In some embodiments, the application can be downloaded to be accessible locally on the user's computing device. The application can offer a device registration and profile interface ("interface") for accessing and modifying settings in the sensor device network and the fire protection system 220. In some embodiments, the application can be configured to connect a user's device (for example, via a WiFi or cellular connection) with an online service provider to add or modify information for the user (user accounts, etc.) stored in the cloud. In some optional embodiments, the user account can also include a sensor data repository that can store data received from sensor devices for review by the user and/or as a baseline reference for the system when determining whether there is a potential danger. In one embodiment, the user account can include a sprinkler database 232, as will be discussed below.

In different embodiments, the application can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In some optional embodiments, sprinkler heads 262 can be configured to receive location data and transmit location data to the system 220. For example, a sprinkler head may be associated with a first GPS or other location sensor that can each transmit in real-time or near-real-time the current location of the sprinkler head. This data is received by a location data processor of the system 220 and stored in sprinkler database 232. Up-to-date location data can be stored in sprinkler database 232, for example. In other embodiments, the locations of the sprinkler heads 262 can be manually inputted by a user via the app to ensure the system 220 can respond optimally to a detected fire event. The sprinkler database 232 can be stored in the cloud or locally, and includes a listing of sprinkler heads for a sprinkler system 260. In some embodiments, the sprinkler database 232 is maintained in association with the user's account. In other embodiments, the sprinkler database 232 is maintained as part of the ground system 220. For example, in different embodiments, the system 220 includes an optional deployment configuration module 230 that includes access to the sprinkler database 232. In some embodiments, a mapping or other information that describes a relative position of each sprinkler head to the structure, and the distance of the sprinkler head from the structure, can also be provided in sprinkler database 232. In one example, the sprinkler database 232 can identify which specific portion of the house (e.g., living room, garage, dining room, nursery, kitchen, bedroom(s), etc.) is nearest to each sprinkler head.

In some embodiments, the deployment configuration module 230 can also include a sprinkler selector 236. The sprinkler selector 236 can receive information from sensors 222 and identify the 'best-fit' or most effective spray pattern of foam. In other words, the sprinkler selector 236 can, in response to data about the direction, movement, speed, and/or predicted path of the fire event, as well as information about the structure (e.g., materials used in various sections of the building that make one portion more prone to fire damage than another, whether fire-retardant coating is already applied to some area of the building, what portions have been deemed inconsequential and low priority by the owner versus which portions were deemed as high priority and high-value/need to protect), to—if appropriate—select a subset of the sprinkler heads for foam emission, and the deployment configuration module 230 will share this decision with the controller 250 for execution.

In some embodiments, only one sprinkler head, at a specific position/distance relative to the structure, may be selected for responding to the fire-event. In another example, alternating sprinkler heads can be selected to maximize the spread of foam while moderating the release of foam based on available foam supply (e.g., as detected by foam monitor 274 connected to foam supply 272). In yet another example, only those sprinkler heads positioned on the side of the building facing the approaching fire can be selected. In some examples, sprinkler heads on three of four sides of a building closest to the approaching fire can be selected by the sprinkler selector 236. In some embodiments, the sprinkler head that has a greater output capacity than neighboring sprinkler heads can be selected. Other sprinkler selection patterns can also be used if they are identified as the best-fit to address the oncoming fire behavior and/or protect high-priority resources or persons (e.g., a sprinkler head nearest the nursery and/or bedrooms can be selected whenever the house is occupied and the time of day is from early evening to late morning). The pattern can also be modified during the course of the fire event, as fire behavior changes, such that sprinkler heads that were inactive (not dispensing foam) become active (dispense foam), and/or sprinkler heads that were active become inactive.

Furthermore, in some embodiments, each sprinkler head's current orientation (what direction are they facing or toward what direction the foam will be emitted) may also be provided. Such information can be used by a directional controller 234 which will monitor the orientation of each sprinkler head and, if deemed necessary by the deployment configuration module 230, signal the controller 250 to rotate or otherwise modify or adjust the sprinkler head's output direction to re-direct the spray of foam to a more desirable target area of the structure or property. It should be appreciated that in different embodiments, the system 220 can be configured to cause deployment of foam in response to manual inputs, rather than the sensors 222. Thus, the system may be started automatically or with human intervention.

Once the controller 250 receives response parameters from the applicator determination module 240, and optionally the deployment configuration module 230, the controller 250 can transmit a command signal to foam supply 272, either via direct communication lines (wiring) or wireless networks.

In some embodiments, the system 220 also includes a foam generation system 270 that operates in conjunction with the controller 250, foam supply 272, and water supply 280. In some embodiments, foam supply 272 comprises a foam chemical storage container, a foam solution storage container, and a conduit for carrying foam chemical from a chemical storage container to the foam solution storage container. A water supply conduit associated with the water supply 280 supplies water to the foam solution container. The direction of flow of these and other flowing materials is in the direction of the foam generation system 270, for dispensing by the sprinkler system 260.

In some embodiments, foam generation system 270 also includes a system control module that controls a compressed air line in communication with the foam generation system 270. For example, a system control module receives instructions from an electrical control unit by way of a conduit. In some embodiments, the system control module also controls flow from the foam solution conduit connected to the foam solution storage container, and on to the sprinkler system. The system control module can control air flow in the compressed air line to provide compressed air flow and to control foam solution flow in foam solution conduit in response to an electrical control from an electrical control unit. In one example, an electrical control unit is controlled by communication line and power supply line. In some embodiments, the foam solution and compressed air flow are combined in a conduit and supplied to foam expansion chamber through a supply conduit until emerging from one or more sprinkler heads. In some embodiments, communication line carries instructions from a variety of sensors or controls (not shown) to activate or otherwise control the system, as described earlier. In some embodiments, foam solution from foam supply 272 and water from water supply 280 are combined to form a dilute solution. Compressed air can be introduced into the dilute solution, and flame-retardant foam is made by introducing the combination of dilute solution and compressed air into an expansion chamber before exiting one or more of the sprinkler heads.

In some optional embodiments, the system 220 can be configured to further base its determination that there is a high likelihood of a fire-event occurring on external sources of data. Some examples are presented in FIG. 2 as external data 208. For example, if an emergency condition (e.g., hurricane, wildfire, act of war, terrorist attacks, disease outbreak, tornado, volcanic eruption, flood, earthquake, storm (wind, rain, and/or snow), drought, etc.) is likely to occur (or predicted by an optional disaster prediction model 212 based on data received (i.e., via a network) from an environmental conditions database 202 for the local region), the system 220 can assess the likelihood of the structure being in danger of fire exposure. Environmental conditions database 202 (e.g., weather reports, environmental disaster agencies, sensors in the region, etc.) can refer to any database that provides real-time updates regarding the region's status, including real-time external conditions for the area.

In another example, crowdsourced data 218 can be used. For example, a crowdsourced decentralized service provider oracle may obtain (e.g., from smartphones of participating users) crowdsourced environment data (e.g., temperature, rainfall, humidity, fire, heat), and provide such (e.g., combined) data for use by the system 220. The system 220 may determine an order to trigger the activation of the sprinkler system with foam if the crowdsourced weather data matches specifications. In another example, a crowdsourced decentralized usage tracking provider oracle may obtain (e.g., from smartphones of participating users) crowdsourced usage data (e.g., via social media services people utilize), and provide such data (e.g., local residents discussing an impending fire-related disaster) to trigger activation of the system 220. Furthermore, as noted earlier, a fire protection app ("app") 210 can be used to trigger manual activation of the system 220.

Figure 3:
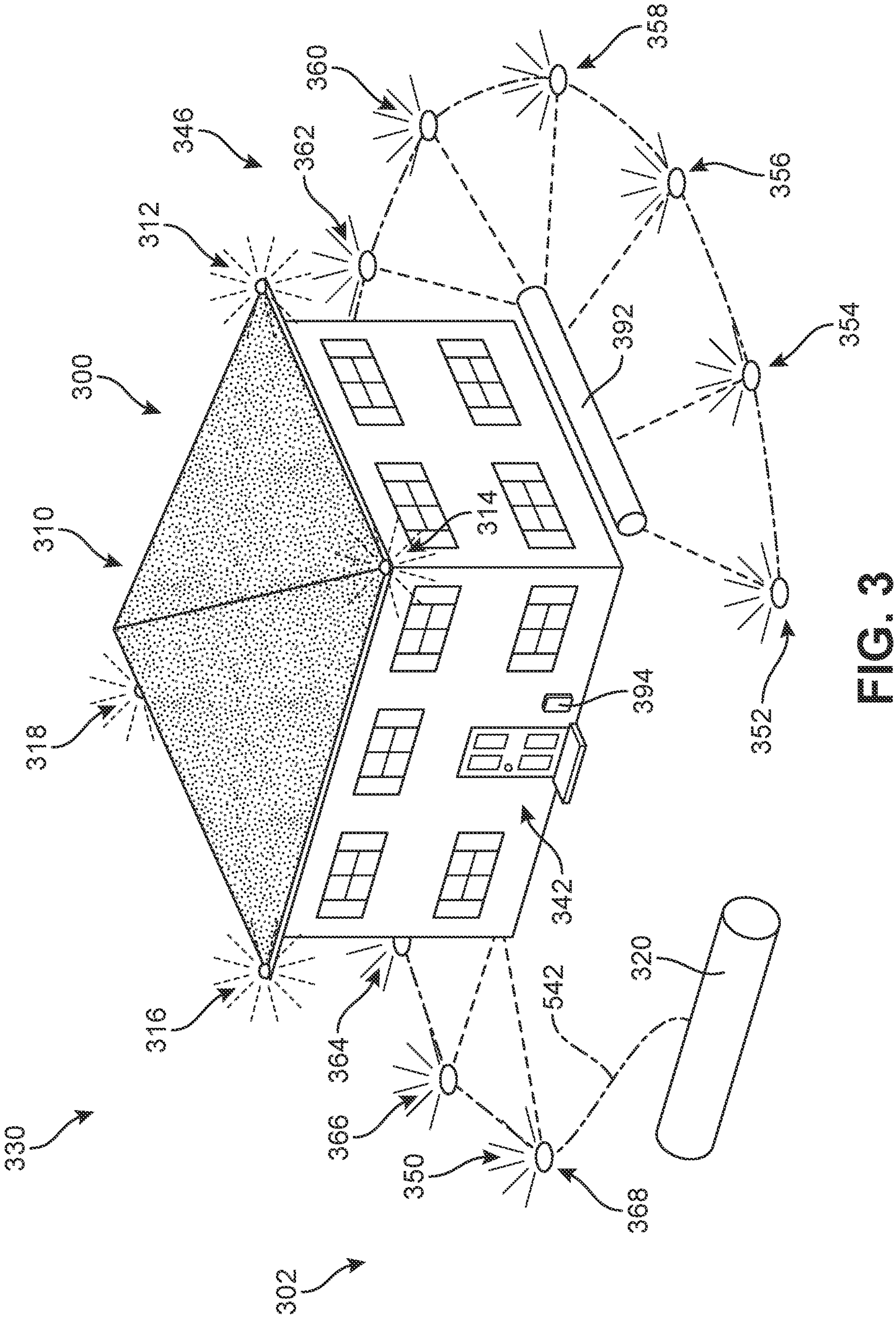
FIG. 3 is an illustration of a property on which a fire protection system has been installed, according to an embodiment.
Figure 4:
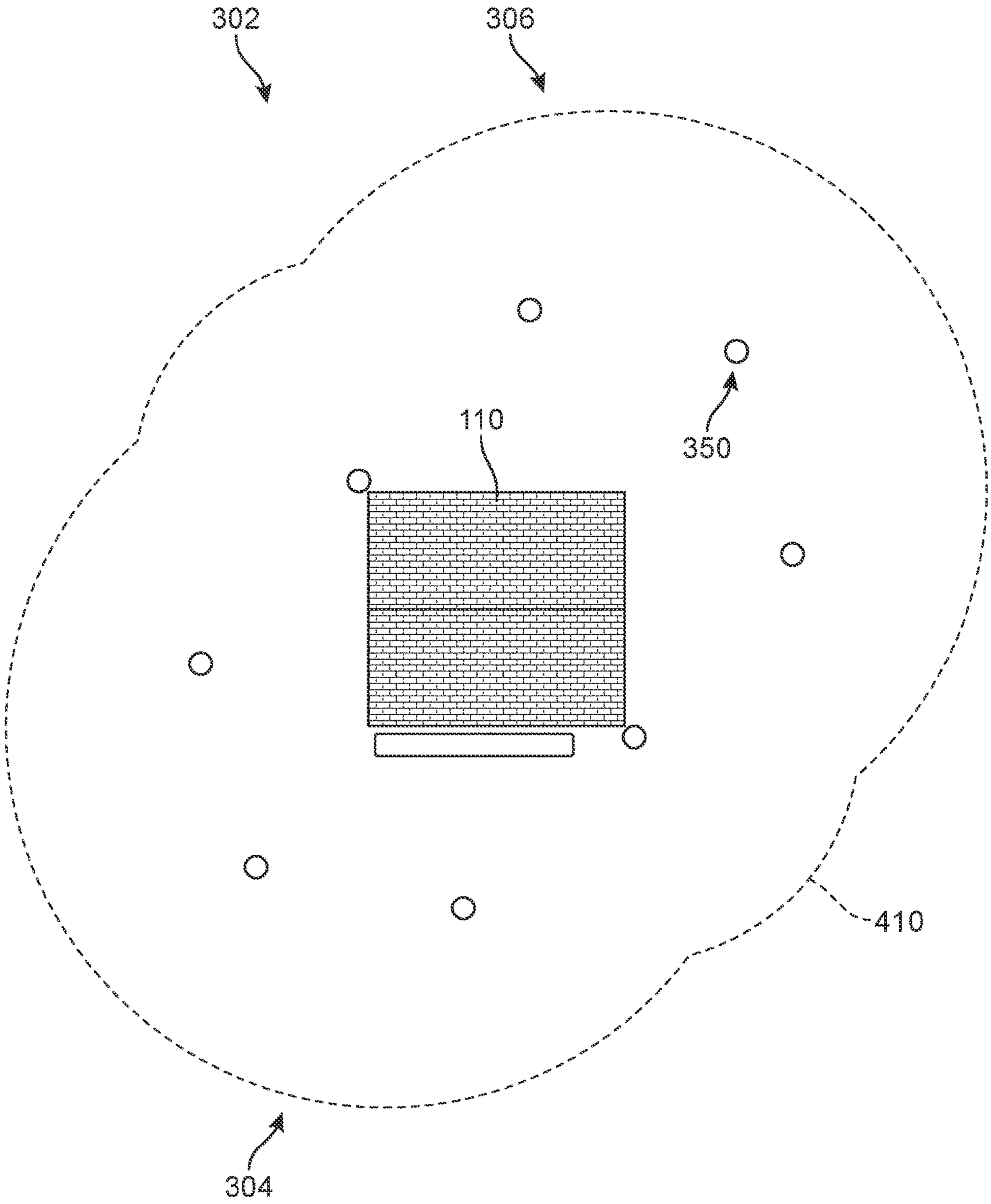
FIG. 4 is a top-down view of the property of FIG. 3 showing a potential perimeter of foam dispersal, according to an embodiment.

Referring now to FIGS. 3 and 4, for purposes of clarity, an example of a first fire protection system ("first system") 330 and associated sprinkler system 350 are depicted, in this case arranged to surround a first house 310 situated on a first property 302. For purposes of simplicity, the first house 310 is shown as being connected to a water supply 320 stored on the first property 302 (toward a front-facing side 342 of the first house 310) which, via a plurality of conduits (e.g., pipes, hoses, tubes, etc.) shown as dotted lines 322 provides water to each sprinkler head of sprinkler system 350 and can also serve as a conduit for the passage of foam. In other embodiments, the first system 330 can be implemented with any other conventional sprinkler system and water supply arrangement.

In FIG. 3, for reference, the sprinkler system 350 includes a first head 352, a second head 354, a third head 356, a fourth head 358, a fifth head 360, a sixth head 362, a seventh head 364, an eighth head 366, and a ninth head 368. Additional sprinkler heads can also be included (e.g., disposed toward a rear 346 of the house), or there may be fewer sprinkler heads. Each sprinkler head is connected to water supply 320 via a direct conduit or a conduit designed to move water through the network of sprinkler heads. In some embodiments, each sprinkler head can include or be otherwise connected to a communication module that receives and/or transmits data to the first system 330.

The first system 330 in FIG. 3 includes a plurality of fire-detection sensors including a first sensor 312, a second sensor 314, a third sensor 316, and a fourth sensor 318. In this case, the sensors have been installed at each of four corners of the first house 310. Each sensor includes a communication module for transmitting data to other components of the first system 330. In other embodiments, there may be fewer sensors, or additional sensors can be installed around the property or along other surfaces of the structure. The first system 330 also includes a foam generation system 392, which can include components and features described above with respect to FIG. 2. In different embodiments, there may be conduits connecting the foam generation system 392 with each of the sprinkler heads and the water supply 320. In some embodiments, an on-site electrical supply 394 provides power to the foam generation system 392.

Moving now to FIG. 4, a bird's-eye (top-down) schematic view of the first property 302 is presented, including the first house 310 and sprinkler system 350. FIG. 4 shows the dispersal zones 410 associated with the present location, range capability, and nozzle (output) orientation of each sprinkler head. It can be appreciated that in this illustration the overlapping zones offer substantially continuous (i.e., unbroken) field of coverage around the perimeter of the first house 310, corresponding in this case to a repeating pattern of concentric semi-circles. Based on the physical arrangement of each of the sprinkler heads by the user, their nozzle orientation, and output capacity, the potential dispersal area can differ from what is shown here. However, for purposes of this example, it can be seen that were there a fire event, the first system 330 could cause dispersal of foam from all of the sprinkler heads and provide a substantially solid or uninterrupted protective border that surrounds the structure.

Figure 5:
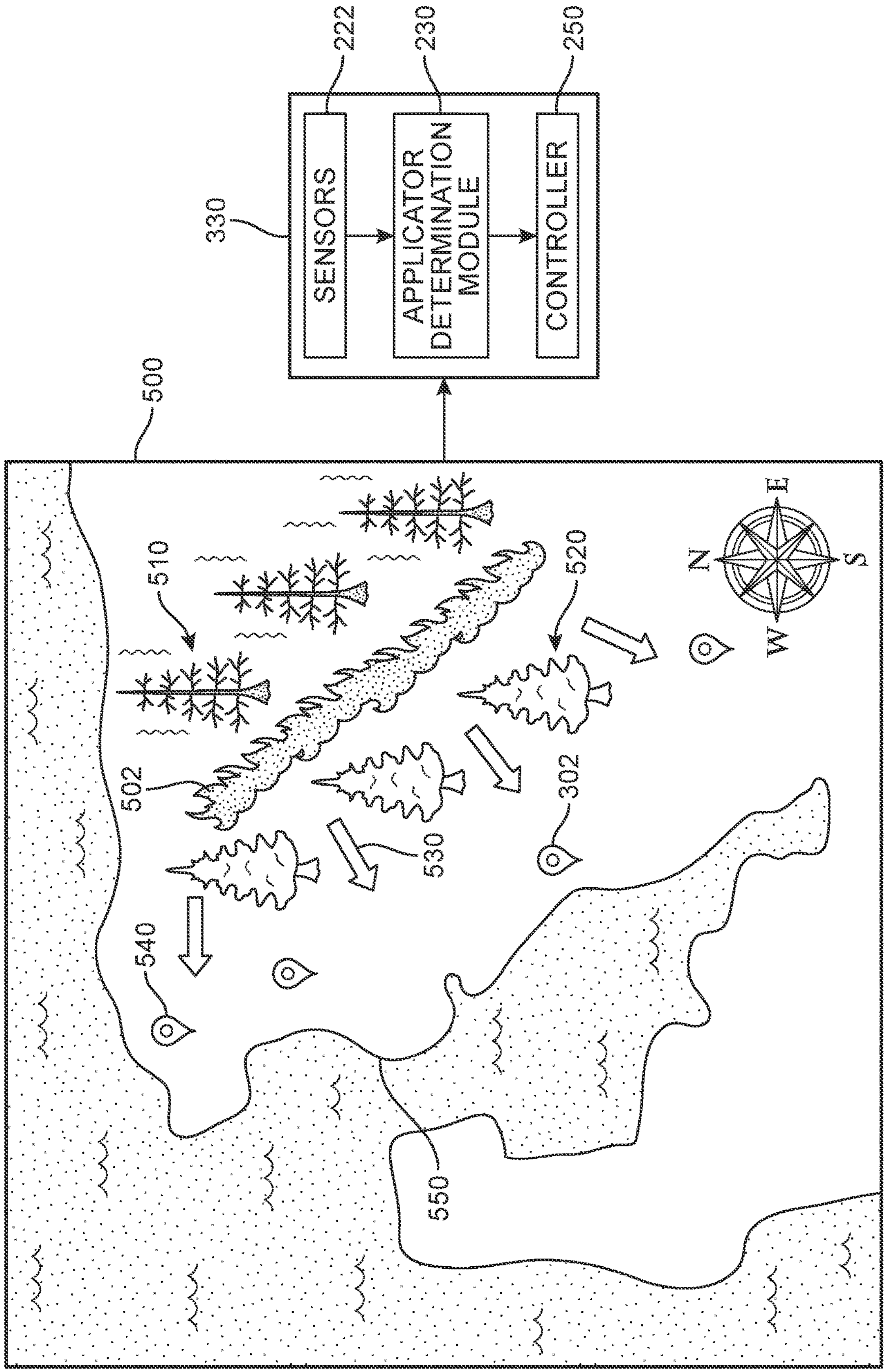
FIG. 5 is a schematic map view of a geographical region in which a wildfire is approaching several properties, according to an embodiment.
Figure 6:
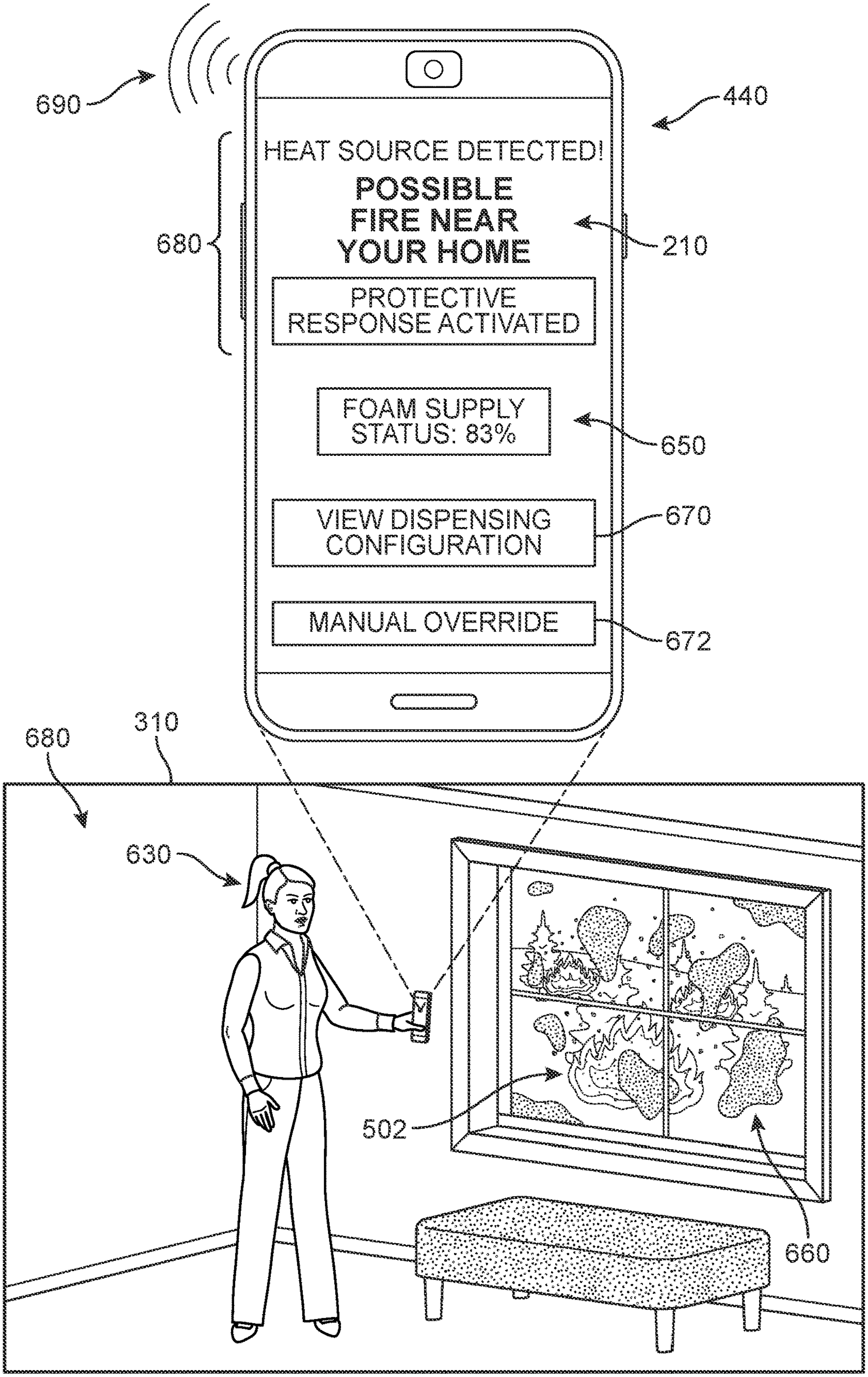
FIG. 6 is a depiction of a user in a home on a property in which a fire protection system has executed a protective action, according to an embodiment.
Figure 7:
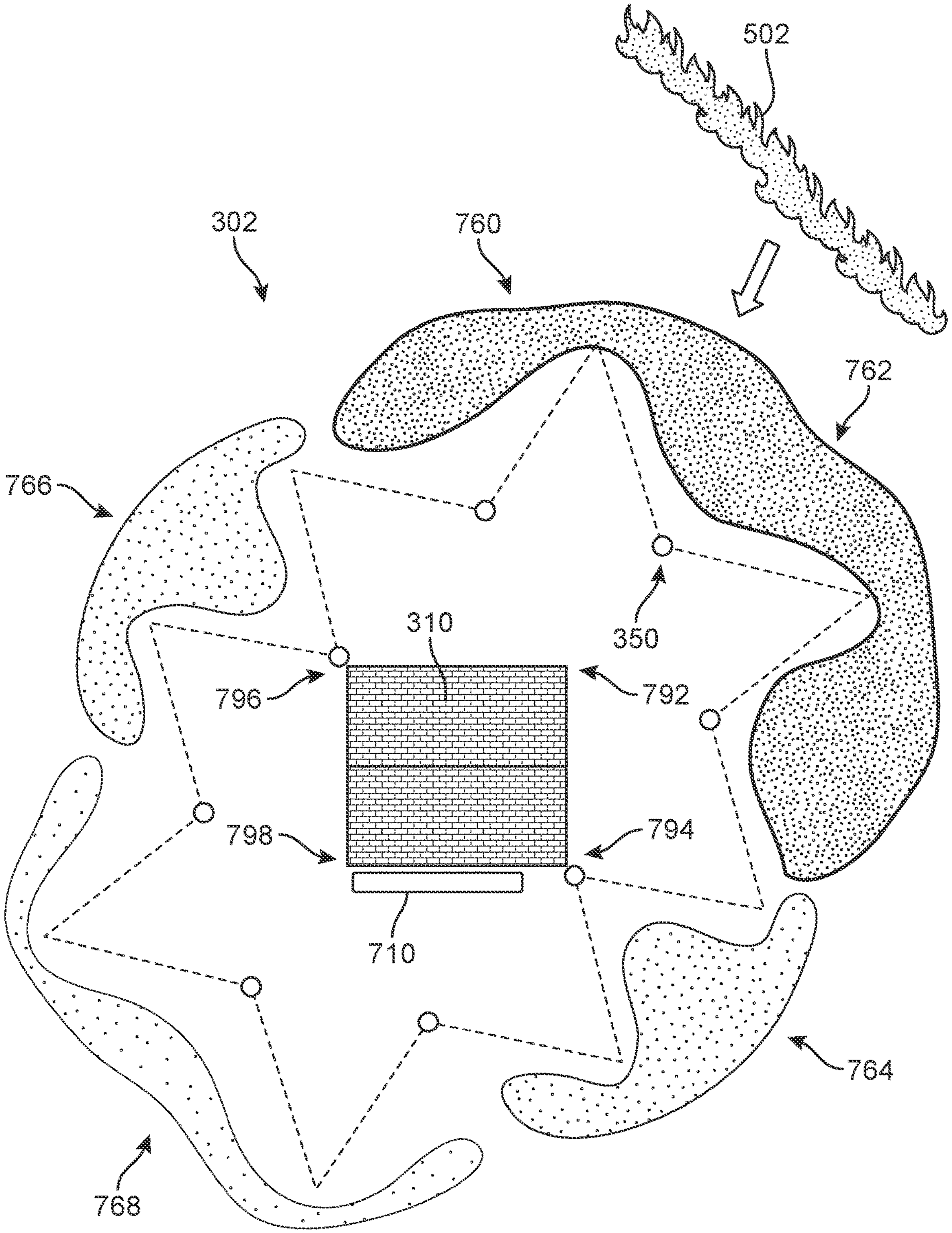
FIG. 7 is a top-down view of the property of FIG. 3 showing one possible pattern of foam application as it is dispensed via the sprinkler system, according to an embodiment.

Referring now to FIGS. 5-7, a sequence of drawings illustrates one example of a use of first fire protection system 330. It should be understood that while the drawings illustrate one example of a geographical region and property environment within which one or more of the devices, methods, systems, services, and/or computer program products described further herein can be applicable, any other environment, including urban and city streets, may implement said systems.

In FIG. 5, a schematic map view of a first geographical region ("first region") 500 is depicted. The first region 500 includes a plurality of properties 540 (shown as "pins") extending down along a coastline 550, including the first property 302. The first property 302 includes protective services provided by the first system 330. FIG. 5 depicts the locations of several properties 540 with respect to a propagating forest fire 502. FIG. 5 shows, schematically, an example of how the disclosed system considers the location of a structure with respect to a detected dangerous condition, such as a forest fire. As shown in FIG. 5, forest fire 502 is proceeding in a generally westward direction indicated by a set of arrows 530. FIG. 5 further illustrates the progression of the forest fire 502 with charred trees 510 where fire 502 has been, and unburned trees 520 ahead of fire 502.

As shown in FIG. 5, the first property 302 is presently inside the path of forest fire 502. The disclosed system may be configured to detect the presence of fire 502 and, in some cases, the direction of propagation of fire 502. In order to determine the presence of fire 502, the system may evaluate data collected by on-site sensors 222, as well as a database describing current environmental conditions in the area. Once the presence and progression of a dangerous fire-related condition is determined by the system, an activation response can be initiated via controller 250, as requested by applicator determination module 230.

Referring now to FIG. 6, as noted earlier, app 210 can be configured to communicate the alerts, emails, messaging, environmental information, and/or system operations over a network to/from the designated device, for example over a personal area network (PAN), short-range wireless communication (e.g., Bluetooth®, NFC), a local area network (LAN), a cellular network, etc. In this example, a first user 630 is shown as standing inside of first house 310 in a room 680 that is near to and provides a view of approaching fire 502. As observable through a window, the sprinkler system is now dispensing foam 660. At the same time, the first user 610 is accessing app 210 via a mobile computing device 640, which communicates with components of the first system over a network 690. In this example, the app 210 presents a user interface that displays a summary alert message 680 ("Heat source detected! Possible fire near your home" with a description of the action that has been taken ("Protective Response Activated")). In addition, in some embodiments, the app 210 can offer selectable options such as a first option 670 to view the current dispensing configuration 670 on a visualization or map layout that can highlight the pattern of selected sprinkler heads currently emitting foam, and a second option 672 to manually override the automated response pattern and/or terminate the response. In some embodiments, the app 210 can also depict a meter or other indicator 650 showing a current reading of the remaining foam ("Foam Supply Status: 83%). The indicator 650 can in some cases also represent a selectable option which, if selected, allow the user to view metrics for the foam usage, and a predicted time at which the foam will run out or fall below effective levels.

In some additional embodiments, the app 210 can also depict to the end-user a map that identifies the locations of each of the sprinklers that have been activated and are dispensing foam, the orientation of these sprinkler heads (i.e., in what direction are they emitting foam), as well as an estimate of the location of the fire and/or high-risk heat areas around the structure. In one example, the app 210 can depict possible safe exit routes and/or present step-by-step directions from the user's current location (based on the user device's location data) by integrating the data about the sprinkler activity and fire/heat danger zones and identifying areas from the user's location to a safe zone that avoid the zones where fire has been detected to help the user navigate away from the danger.

It should be understood that the text, images, and specific application features shown in the figures are for purposes of illustration only and in no way limit the manner by which the application may communicate or receive information. In addition, in other embodiments, one or more options or other fields and text may appear differently and/or may be displayed or generated anywhere else on the screen(s) associated with the client's system, including spaced apart from, adjacent to, or around the user interface. In other words, the figures present only one possible layout of the interface, and do not in any way limit the presentation arrangement of any of the disclosed features.

FIG. 7 again shows a top-down schematic view of first property 302, as first system 330 performs a protective action in response to the approaching fire 502. In this example, the fire 502 is approaching from a northeastern direction, which is on target to initially affect or damage a first corner portion 792 of the first house 310. In contrast, a second corner portion 794 and a third corner portion 796 will likely only be affected after the first corner portion 792 is consumed, while a fourth corner portion 798 will be least impacted. In response to the fire's approach direction and predicted path, as well as the current layout of the sprinkler heads for sprinkler system 350 and their respective orientations, the deployment configuration module (see FIG. 2) can determine the optimal dispersal involves a larger and/or earlier foam release from a northeastern section of the sprinkler system 350, a moderate and/or secondary foam release from a northwestern and western section, as well as an eastern section, of the sprinkler system 350, and a minimal or delayed foam release from a southwestern or southern section of the sprinkler system 350. This is symbolized by the varying thickness of a foam perimeter 760, which is thickest at a first perimeter section 762, intermediate at a second perimeter section 764 and a third perimeter section 764, and thinnest along a fourth perimeter section 768. Thus, in different embodiments, not only can the deployment configuration module identify which specific sprinklers should be used to emit the foam, but also stagger the release of foam to coincide with the expected impact from the fire, and the amount of the foam to be increased to coincide with the areas that are high priority or most likely to be impacted by the fire.

Figure 8:
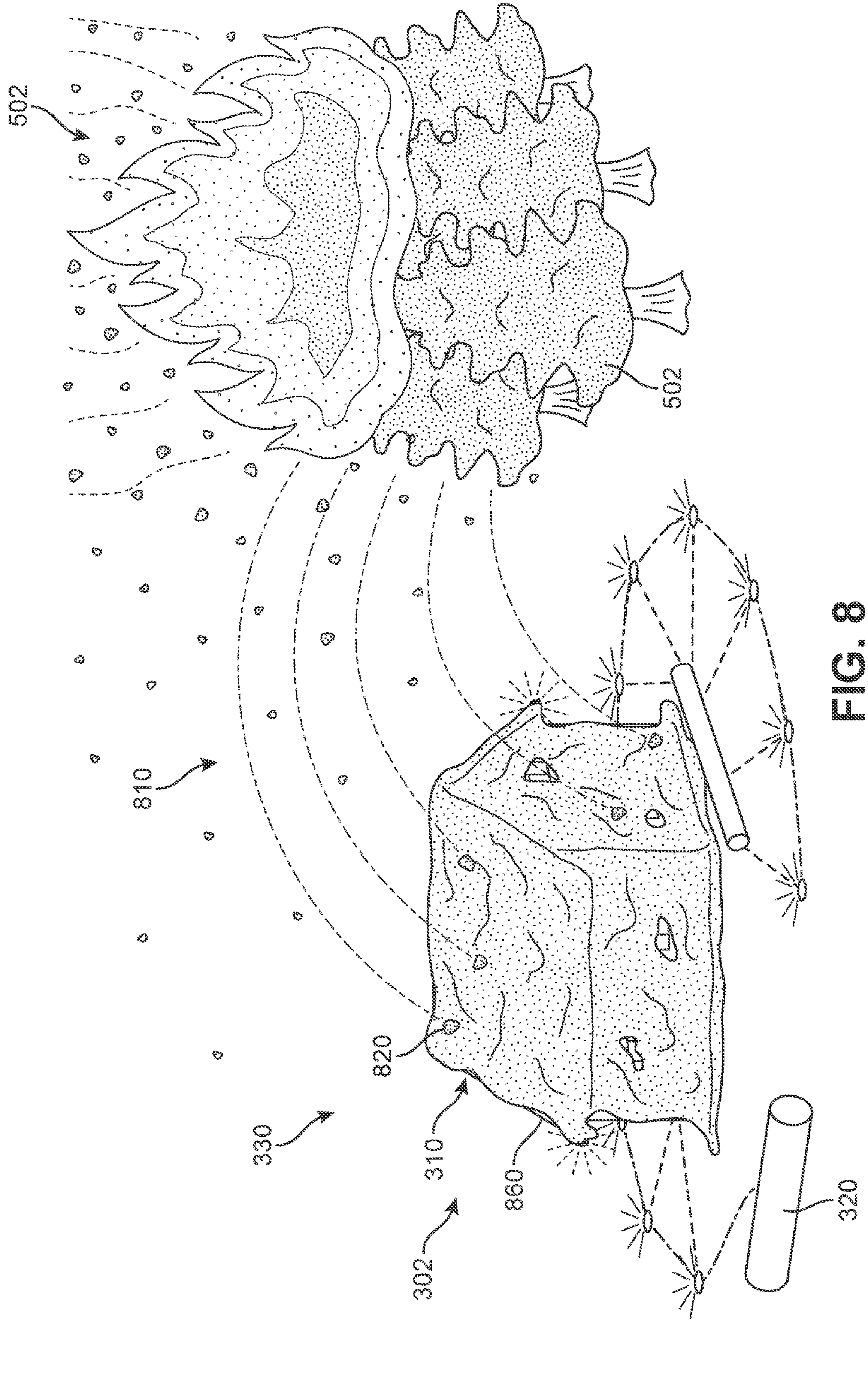
FIG. 8 is a depiction of an alternate pattern of a foam application in which the sprinkler system is oriented toward the roof and walls of the structure, according to an embodiment.

As noted earlier, in some embodiments, the orientation of the sprinkler heads can be modified to aim the foam toward different parts of the property. In FIG. 8, an alternate example of first system 330 performing a protective action in response to the approaching fire 502 is shown. In this example, the first system 330 receives data indicating the fire 502 includes a large number of flying embers that would likely arc over the perimeter-type foam protection of FIG. 7 to ignite the structure. In response, the first system 330 determines the optimal protective configuration involves rotation of the sprinkler heads to face toward the first house 310, with a redirection of their nozzles upward. Thus, when the foam is dispensed, it can stream upward and into a central point where the structure stands, and slowly slide down the roof and walls. As a result, the first house 310 becomes coated, encased, or otherwise covered by a foam barrier 860 that is in direct contact with its exterior surface. As the fire 502 continues to move along its path, closer to the first house 310, embers 820 can be seen flying through the air and striking the foam barrier 860, which repels the embers 820 and prevents the propagation of fire to the structure.

Figure 9A:
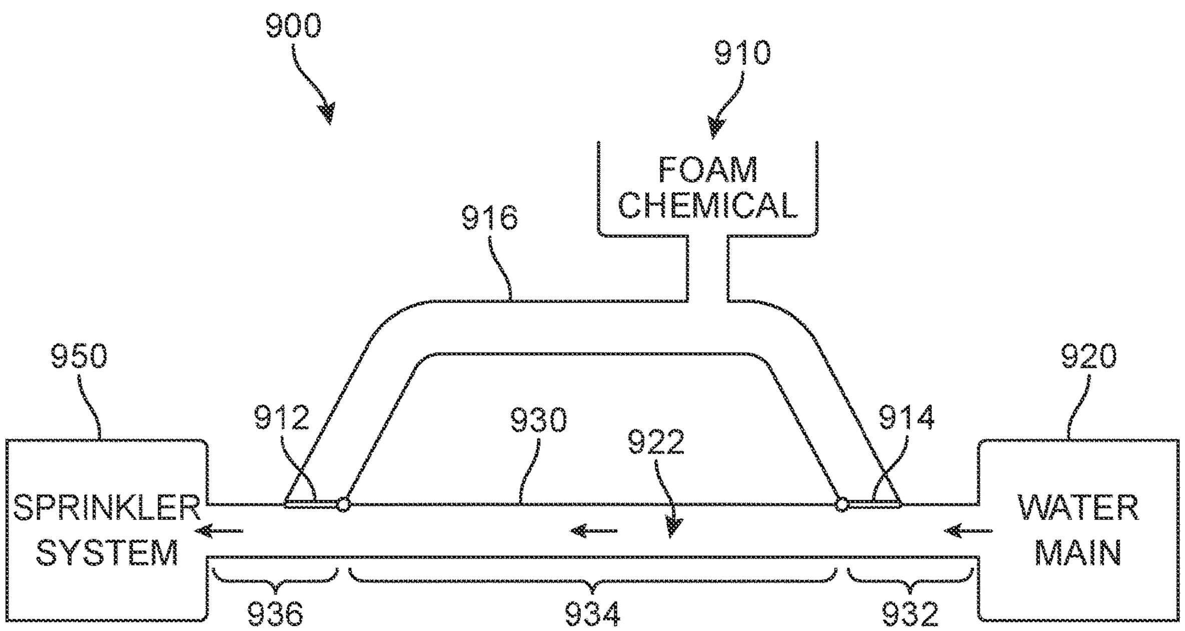
FIGS. 9A and 9B present an example of a mechanism by which a foam chemical is added to the water supply for the sprinkler system.
Figure 9B:
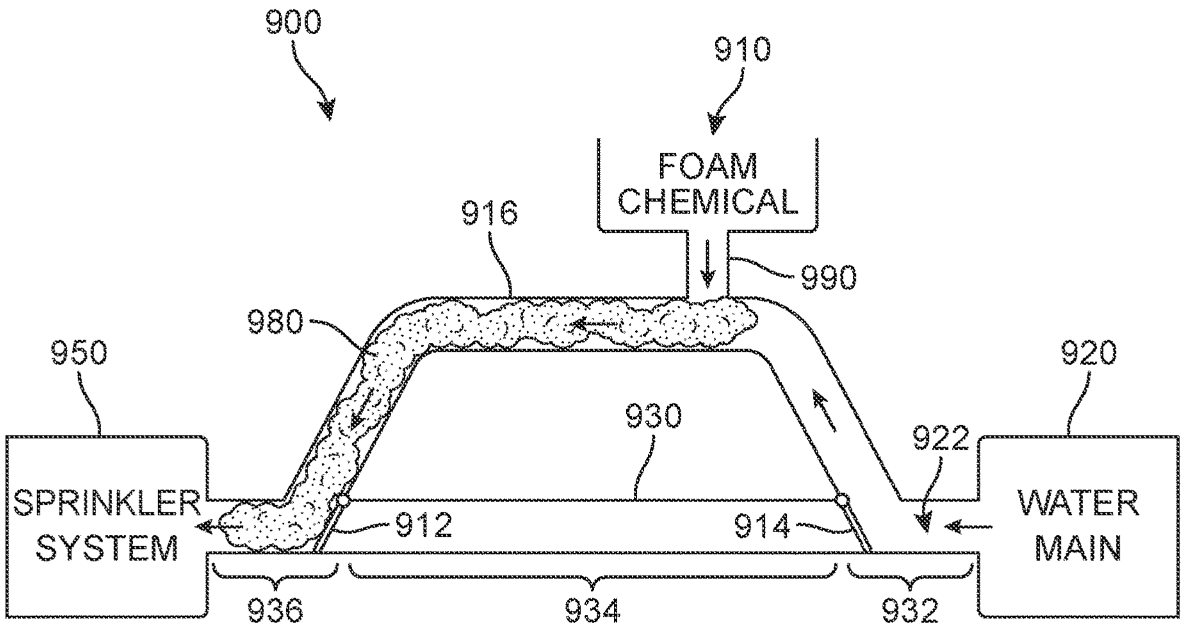

Referring now to FIGS. 9A and 9B, for purposes of illustration, a diverter subsystem 900 for diverting foam chemicals to the sprinkler system is schematically depicted. In FIG. 9A, the standard, normal, or initial (no fire detected/safe) state is shown. The diverter subsystem 900 includes a first pipe 930 connecting the water source (e.g., shown here as water main 920) with a sprinkler system 950. As shown herein, water 922 from water main 920 can travel through a first segment 932 of first pipe 930, and continue to travel uninterrupted through a second segment 934 and also into a third segment 936, until arriving at the sprinkler system 950 and supplying the sprinkler heads with water.

In addition, a second pipe 916, shown as having a "U" or other curved shape, is connected at a first end from a first portion of the first pipe 930 (along first segment 932) to a second portion of the first pipe 930 (along third segment 936) by its second end. The second pipe 916 can be understood to have inlet (connecting to the first segment 932) at the first end that is disposed closest to the water main 920, and an outlet (connecting to the third segment 936) at the opposite second end, closest to the sprinkler system 950. In this initial state, the inlet is presently blocked or closed by a first diverter valve 914, and the outlet is also presently blocked or closed by a second diverter valve 912. The second pipe 916 can further be seen to be in fluid communication with a foam chemical 910, as described herein.

In different embodiments, as depicted in FIG. 9B, the foam chemical 910 is stored in a container at higher pressure than the water main, so that when the system transitions from its normal state to the active, fire protection response state, foam chemical 910 can be immediately released and push into the second pipe 916 via a feed line 990. In some embodiments, the release of foam from its storage container can be automatically triggered by the system based on decision made by the applicator determination module (see FIG. 2). At the same time, the first diverter valve 914 and the second diverter valve 912 can be switched to open the inlet and outlet. As shown in FIG. 9B, the first diverter valve 914 receives a signal (either mechanically or via a wireless controller module) to flip along a hinge or other rotatable mechanism, causing the first segment 932 to now be in fluid communication with the second pipe 916 and the foam chemical 910 that has been released into the second pipe 916. At the same time, water 922 is diverted and travels into the inlet, and is blocked from moving into the second segment 934 of the first pipe 934. In other words, a detour is caused, and water is supplied to the foam chemical 910, which combine to produce foam 980. The foam 980 is generated and moves naturally toward the outlet, which is now open, as the second diverter valve 912 has also received a signal to flip along its hinge and cause the third segment 936 to be in fluid communication with the second pipe 916, while blocking the ingress of water from the second segment 934. This foam 980 is then provided to the sprinkler system 950, which is configured to release the foam 980 as described herein via sprinkler heads.

Figure 10:
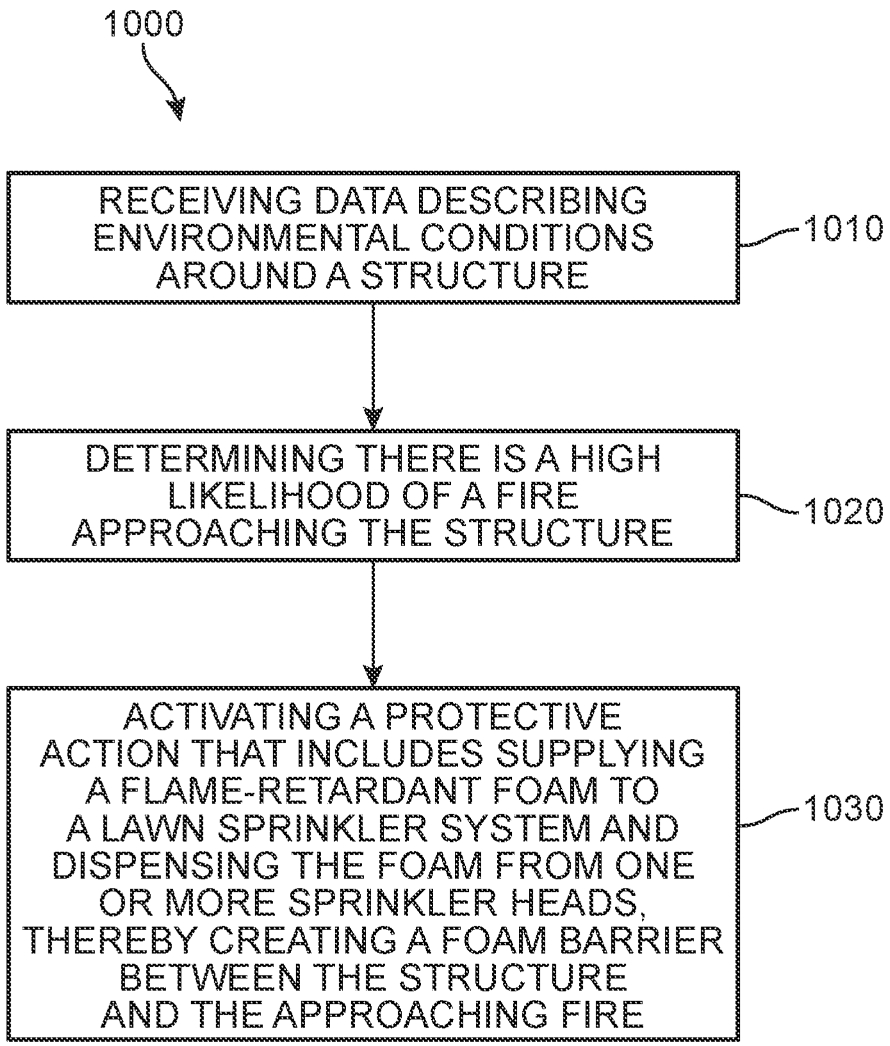
FIG. 10 is a flow diagram of a process for protecting property from fire, according to an embodiment.

FIG. 10 is a flow chart illustrating an embodiment of a method 1000 for protecting a property from fire. The method 1000 includes a first step 1010 of receiving, at a fire protection system, first data describing environmental conditions around a structure situated on the property. The method 1000 also includes a second step 1020 of determining, at the fire protection system and based on the first data, there is a high likelihood of a fire approaching the structure. A third step 1030 includes executing, by the fire protection system, a protective action that includes: (a) supplying a flame-retardant foam to a sprinkler system associated with the property, (b) manually or automatically switching or otherwise causing the sprinkler system to switch from a water mode to a fire prevention mode (e.g., fire prevention mode can include appropriate settings such as modifying the orientation of sprinkler heads and/or determining the speed of dispensing the flame-retardant foam), and (c) dispensing the flame-retardant foam from one or more sprinkler heads of the sprinkler system, thereby creating a foam barrier between the structure and the approaching fire.

In other embodiments, the method may include additional steps or aspects. In one embodiment, the method also includes combining a foam solution and water to form dilute solution; introducing air into the dilute solution; and forming the flame-retardant foam by introducing the dilute solution and air into an expansion chamber. In one embodiment, the first data is collected by a first sensor that is installed on an exterior of the structure. In another example, the sprinkler system includes a plurality of sprinkler heads and the method can further include selecting, by the fire protection system and based on the first data, a first sprinkler head of the sprinkler system, wherein the flame-retardant foam is dispensed from only the first sprinkler head.

In some embodiments, the sprinkler system includes a plurality of sprinkler heads and the method may also include steps of identifying, at the fire protection system, a first approach direction of the fire relative to the structure, the first approach direction targeting a first portion of the structure; and selecting, by the fire protection system and based on the first approach direction, only a subset of the plurality of sprinkler heads to dispense the flame-retardant foam, the subset corresponding to those sprinkler heads positioned within a first range of the first portion. In another example, the method includes receiving, at the fire protection system, second data from an environmental conditions database, wherein the determination that there is a high likelihood of a fire approaching the structure is also based on the second data.

In some embodiments, the sprinkler system includes a plurality of sprinkler heads, and the method can further include steps of identifying, at the fire protection system, a first approach direction of the fire relative to the structure, the first approach direction targeting a first portion of the structure; and dispensing a first amount of flame-retardant foam by sprinkler heads positioned within a first range of the first portion, and a second amount of flame-retardant foam by sprinkler heads positioned outside of the first range, the first amount being larger than the second amount. In another embodiment, the sprinkler system includes a first sprinkler head with a first nozzle that is oriented toward a lawn for the property, and the method further comprises causing the first sprinkler head to rotate such that the first nozzle is re-oriented toward and faces the structure. In some examples, the flame-retardant foam forms a protective coating along an exterior surface of the structure. In one example, the method also includes steps of receiving, at the fire protection system, updated data describing the environment around the structure; and terminating, in response to the updated data, the protective action.

Other methods may be contemplated within the scope of the present disclosure. For example, in some embodiments, a method for protecting property from fire can include a first step of receiving, at a fire protection system, a first request by a first user to initiate a protective action on behalf of a structure situated on the property, and a second step of executing, by the fire protection system, the protective action that includes: supplying a flame-retardant foam to a sprinkler system associated with the property, and dispensing the flame-retardant foam from one or more sprinkler heads of the sprinkler system, thereby creating a foam barrier between the structure and the approaching fire.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for protecting a property from fire using a sprinkler system in communication with a water main installed on the property, the method comprising:

receiving, at a fire protection system and from a first sensor, first data describing environmental conditions around a structure situated on the property;

determining, at the fire protection system and based on the first data, there is a high likelihood of a fire approaching the structure; and automatically executing, by the fire protection system and responsive to the determination of the high likelihood of the fire, a protective action that includes:

blocking a flow of water from the water main from directly entering the sprinkler system, diverting the water into a diverter subsystem that is in fluid communication with both the water main and the sprinkler system, the diverter subsystem including a foam chemical, generating a flame-retardant foam by combining the water and foam chemical, routing the flame-retardant foam from the diverter subsystem to the sprinkler system, and dispensing the flame-retardant foam from one or more sprinkler heads of the sprinkler system, thereby creating a foam barrier between the structure and the approaching fire.

2. The method of claim 1, wherein generating the flame-retardant foam further includes:

introducing air to the combination of water and foam chemical.

3. The method of claim 1, wherein the first sensor is installed on an exterior of the structure.

4. The method of claim 1, further comprising selecting, by the fire protection system and based on the first data, a first sprinkler head of the sprinkler system, wherein the flame-retardant foam is dispensed from only the first sprinkler head.

5. The method of claim 1, further comprising:

identifying, at the fire protection system, a first approach direction of the fire relative to the structure, the first approach direction targeting a first portion of the structure; and selecting, by the fire protection system and based on the first approach direction, only a subset of the plurality of sprinkler heads to dispense the flame-retardant foam, the subset corresponding to those sprinkler heads positioned within a first range of the first portion.

6. The method of claim 1, further comprising receiving, at the fire protection system, second data from an environmental conditions database, wherein the determination that there is a high likelihood of the fire approaching the structure is also based on the second data.

7. The method of claim 1, further comprising:

identifying, at the fire protection system, a first approach direction of the fire relative to the structure, the first approach direction targeting a first portion of the structure; and dispensing a first amount of flame-retardant foam by sprinkler heads positioned within a first range of the first portion, and a second amount of flame-retardant foam by sprinkler heads positioned outside of the first range, the first amount being larger than the second amount.

8. The method of claim 1, wherein the sprinkler system includes a first sprinkler head with a first nozzle that is oriented toward a lawn for the property, and the method further comprises causing the first sprinkler head to rotate such that the first nozzle is re-oriented toward and faces the structure.

9. The method of claim 1, wherein the flame-retardant foam forms a protective coating along an exterior surface of the structure.

10. The method of claim 1, wherein the method further comprises:

receiving, at the fire protection system, updated data describing the environment around the structure; and terminating, in response to the updated data, the protective action.

11. A method of protecting a property from fire using a sprinkler system in communication with a water main installed on the property, the method comprising:

receiving, at a fire protection system and via a fire protection app, a first request by a first user to initiate a protective action on behalf of a structure situated on the property;

executing, by the fire protection system, the protective action that includes:

blocking a flow of water from the water main from directly entering the sprinkler system, diverting the water into a diverter subsystem that is in fluid communication with both the water main and the sprinkler system, the diverter subsystem including a foam chemical, generating a flame-retardant foam by combining the water and foam chemical, routing the flame-retardant foam from the diverter subsystem to the sprinkler system, and dispensing the flame-retardant foam from one or more sprinkler heads of the sprinkler system, thereby creating a foam barrier between the structure and an approaching fire; and presenting to the first user, via the fire protection app, a user interface that depicts one or more of a meter showing a current reading of remaining foam, a map that identifies locations of the one or more sprinkler heads that are dispensing foam, and a predicted time at which the foam will run out or fall below effective levels.

12. A system for protecting a property from fire using a sprinkler system in communication with a water main installed on the property, the system comprising a processor and machine-readable media including instructions which, when executed by the processor, cause the processor to:

receive, at a fire protection system and from a first sensor, first data describing environmental conditions around a structure situated on the property;

determine, at the fire protection system and based on the first data, there is a high likelihood of a fire approaching the structure; and automatically execute, by the fire protection system and responsive to the determination of the high likelihood of the fire, a protective action that includes:

blocking a flow of water from the water main from directly entering the sprinkler system, diverting the water into a diverter subsystem that is in fluid communication with both the water main and the sprinkler system, the diverter subsystem including a foam chemical, generating a flame-retardant foam by combining the water and foam chemical, routing the flame-retardant foam from the diverter subsystem to the sprinkler system, and dispensing the flame-retardant foam from one or more sprinkler heads of the sprinkler system, thereby creating a foam barrier between the structure and the approaching fire.

13. The system of claim 12, wherein the instructions further cause the processor to introduce air to the combination of water and foam chemical in order to generate the flame-retardant foam.

14. The system of claim 12, wherein the first sensor is installed on an exterior of the structure.

15. The system of claim 12, wherein the sprinkler system includes a plurality of sprinkler heads, and the instructions further cause the processor to select, by the fire protection system and based on the first data, a first sprinkler head of the sprinkler system, wherein the flame-retardant foam is dispensed from only the first sprinkler head.

16. The system of claim 12, wherein the instructions further cause the processor to:

identify, at the fire protection system, a first approach direction of the fire relative to the structure, the first approach direction targeting a first portion of the structure; and select, by the fire protection system and based on the first approach direction, only a subset of the plurality of sprinkler heads to dispense the flame-retardant foam, the subset corresponding to those sprinkler heads positioned within a first range of the first portion.

17. The system of claim 12, wherein the instructions further cause the processor to receive, at the fire protection system, second data from an environmental conditions database, wherein the determination that there is a high likelihood of the fire approaching the structure is also based on the second data.

18. The system of claim 12, wherein the instructions further cause the processor to:

identify, at the fire protection system, a first approach direction of the fire relative to the structure, the first approach direction targeting a first portion of the structure; and dispense a first amount of flame-retardant foam by sprinkler heads positioned within a first range of the first portion, and a second amount of flame-retardant foam by sprinkler heads positioned outside of the first range, the first amount being larger than the second amount.

19. The system of claim 12, wherein the sprinkler system includes a first sprinkler head with a first nozzle that is oriented toward a lawn for the property, and the instructions further cause the processor to cause the first sprinkler head to rotate such that the first nozzle is re-oriented toward and faces the structure.

20. The system of claim 12, wherein the flame-retardant foam forms a protective coating along an exterior surface of the structure.

* * * * *